(12) United States Patent
Köhler et al.

(10) Patent No.: US 6,238,027 B1
(45) Date of Patent: May 29, 2001

(54) SWITCHING CABINET

(75) Inventors: Martina Köhler, Herborn; Wolfgang Reuter, Burbach; Rolf Benner, Herborn, all of (DE)

(73) Assignee: Rittal-Werk Rudolf Loh GmbH & Co. KG, Herborn (DE)

( * ) Notice: Subject to any disclaimer, the term of this patent is extended or adjusted under 35 U.S.C. 154(b) by 0 days.

(21) Appl. No.: 09/293,684

(22) Filed: Apr. 16, 1999

(30) Foreign Application Priority Data

Apr. 18, 1998 (DE) ............................................. 198 17 245

(51) Int. Cl.$^7$ ................................................... A47G 29/00
(52) U.S. Cl. ...................... 312/265.1; 312/265.3
(58) Field of Search ...................... 312/257.1, 265.1, 312/265.3, 265.6, 283, 289, 287, 326, 329, 223.1; 361/641, 724; 16/389; 211/26, 26.2

(56) References Cited

U.S. PATENT DOCUMENTS

| | | | |
|---|---|---|---|
| 3,188,159 | * 6/1965 | Wenger et al. | 312/326 X |
| 5,407,263 | * 4/1995 | Jones et al. | 312/265.1 |
| 5,877,938 | * 4/1995 | Hobbs et al. | 361/724 |
| 5,971,511 | * 10/1999 | Diebel et al. | 312/265.3 |

FOREIGN PATENT DOCUMENTS

| | | |
|---|---|---|
| 41 03 785 C2 | 11/1992 | (DE) . |
| 93 04 072 U1 | 8/1993 | (DE) . |
| 195 36 925 A1 | 4/1997 | (DE) . |
| 197 00 126 A1 | 9/1997 | (DE) . |
| 196 47 814 A1 | 5/1998 | (DE) . |

* cited by examiner

Primary Examiner—Peter M. Cuomo
Assistant Examiner—Michael J. Fisher
(74) Attorney, Agent, or Firm—Pauley Petersen Kinne & Fejer

(57) ABSTRACT

A switching cabinet with a rack assembled from horizontal and vertical frame sections, in which a switching cabinet body enclosed by the rack is covered by a cabinet door and side walls, the cabinet door being hinged around one of the vertical frame sections and pivotal about the vertical pivot axis. To obtain improved access to the interior of the switching cabinet, at least one of the side walls is fixedly mounted on the rack or is hinged to pivot about a vertical axis.

4 Claims, 4 Drawing Sheets

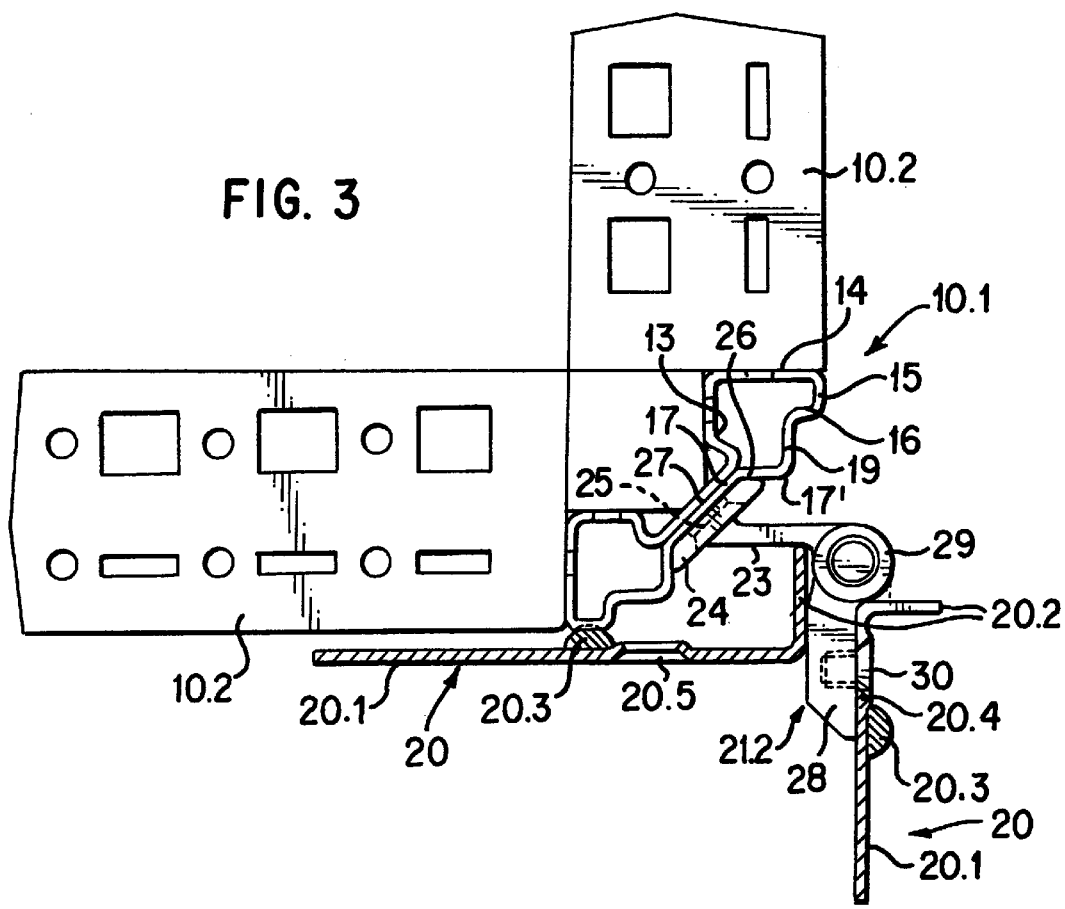

SWITCHING CABINET

BACKGROUND OF THE INVENTION

1. Field of the Invention

This invention relates to a switching cabinet with a rack assembled from horizontal and vertical frame sections, in which the switching cabinet body enclosed by the rack can be covered with a cabinet door and side walls, the cabinet door being hinged to one of the vertical frame sections and is pivotal about a vertical pivot axis.

2. Description of Prior Art

This type of switching cabinet is known from German Patent Reference DE 41 03 785 C2.

An interior space of such switching cabinets is equipped with electrical switching units. During operating time the electrical switching units must be maintained and replaced when necessary. The switching cabinets are often tightly occupied so that the accessibility to individual units is highly limited.

It is one object of this invention to provide a switching cabinet of the type mentioned at the outset in which the accessibility to the switching cabinet interior is improved in simple fashion.

The object of this invention is achieved with at least one of the side walls fixedly mounted on the rack or hinged to pivot around a vertical axis.

When accessibility to the switching cabinet interior is improved, the conventional side wall can be connected to pivot on the rack instead of using a rigid connection. In this type of switching cabinet, the switching cabinet interior is then accessible both through the cabinet door and through the side wall. The other side walls could naturally also be hinged so that the interior of the switching cabinet is accessible on all sides.

If the side wall has fastening mounts to which the hinges or side wall supports are applied, which are connected to the corresponding vertical frame section, then no additional measures need be taken to mount the hinges on an existing side wall.

As one advantage, the side wall of the switching cabinet is hinged to the rack and has fastening mounts on the closure side opposite the hinge side, on which the side wall can be locked to ordinary side wall supports in the closed state.

The side wall can be easily locked by designing the fastening mounts as openings through which fastening screws can be passed and screwed into threaded mounts of the side wall supports.

According to one preferred embodiment of this invention the hinged side wall has a continuous seal on an inside facing the switching cabinet interior and the hinge is screwed to the side wall outside of the sealing area enclosed by the seal. Because the fact that the hinges are arranged outside of the sealing area, complicated measures to seal the hinge connection sites become unnecessary.

In a switching cabinet according to this invention the hinges of a side wall can keep the vertical pivot axis in front of the outward facing front side of the side wall in order to permit an opening angle of 180°. Good accessibility to the switching cabinet interior is thus possible.

However, it is also possible for the hinges of a side wall to be arranged and recessed relative to the front side formed by the side wall, to permit an opening angle of up to 90°. The recessed hinge is then visually inconspicuous. For facilitated installation of the hinge the vertical frame sections can have an external mount for hinges of the side wall running in the longitudinal direction of the section and directed toward the outside of the rack, which is bounded by two longitudinally directed side support sections on which the hinges are aligned with centering surfaces. The hinges can be aligned on the support sections.

BRIEF DESCRIPTION OF THE DRAWINGS

This invention is further explained below with reference to practical examples shown in the drawings wherein:

FIG. 3 shows a horizontal partial sectional view of the vertical frame section as shown in FIG. 2, with the hinged and opened side wall;

FIG. 4 shows a horizontal partial sectional view of the vertical frame section as shown in FIG. 3, with the closed cabinet door.

DESCRIPTION OF PREFERRED EMBODIMENTS

Figure 1:
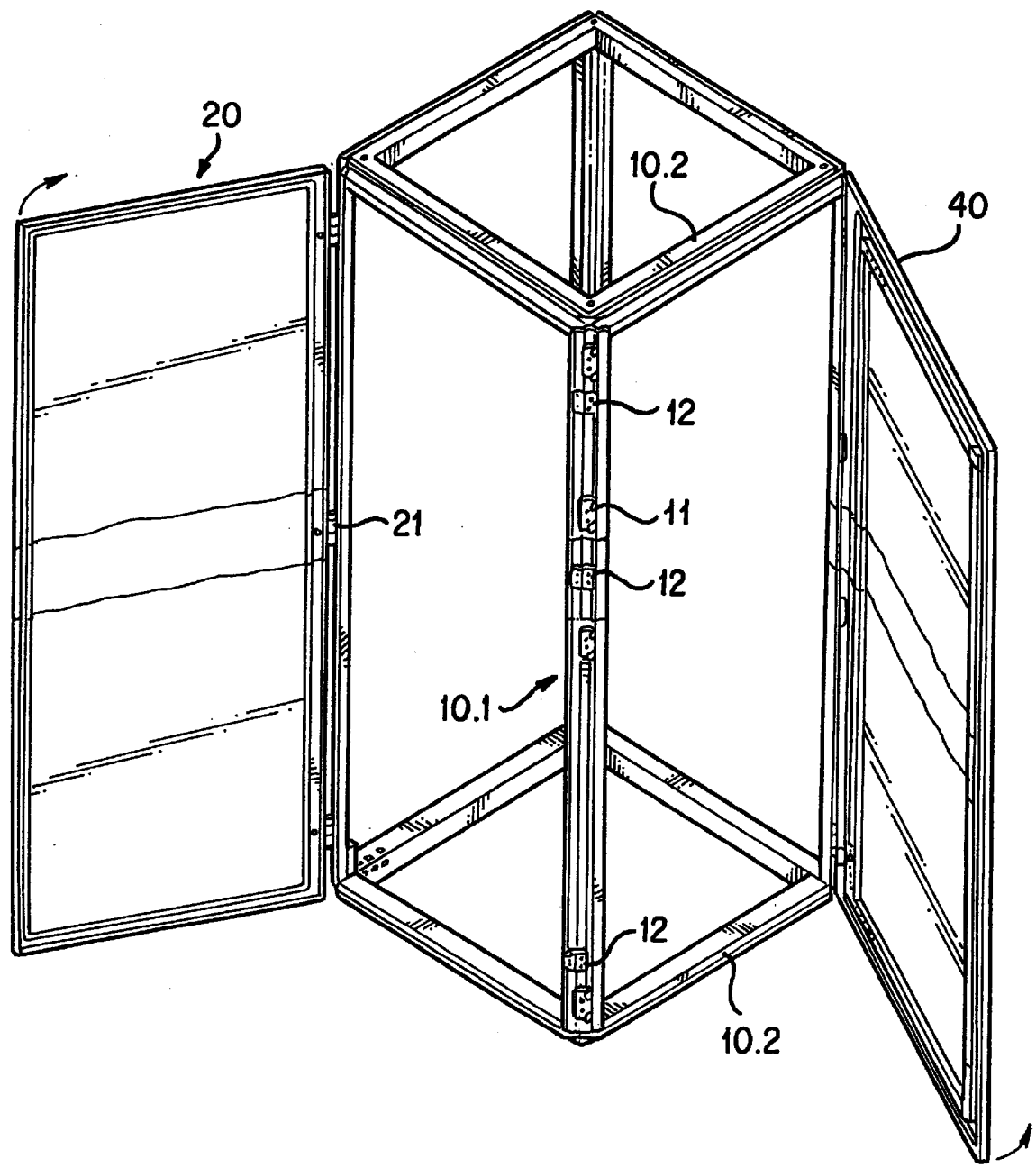
FIG. 1 shows a perspective view of a rack of a switching cabinet with a cabinet door and a pivotal side wall.

A rack of a switching cabinet is shown in FIG. 1. The rack comprises 12 frame sections; four vertical frame sections 10.1 and eight horizontal frame sections 10.2. The vertical frame sections 10.1 all have the same cross-sectional geometry. The horizontal frame sections 10.2 are designed as depth and width struts and have the same cross section. The open front side of the rack can be closed by means of a cabinet door 40. The cabinet door 40 is connected via hinges to one of the two vertical frame sections 10.1 on the front. The other vertical frame section 10.1 on the front is equipped with closure elements 11. The cabinet door 40 can be locked to the closure elements in the closed state. The three open sides of the rack can be covered with side walls 20. The side walls 20 can be fixedly screwed to the rack or designed as additional doors that are connected to pivot via hinges 21 on a vertical frame section 10.1. The side wall supports 12 are used to fix the side wall 20 in the closed state.

Figure 2:
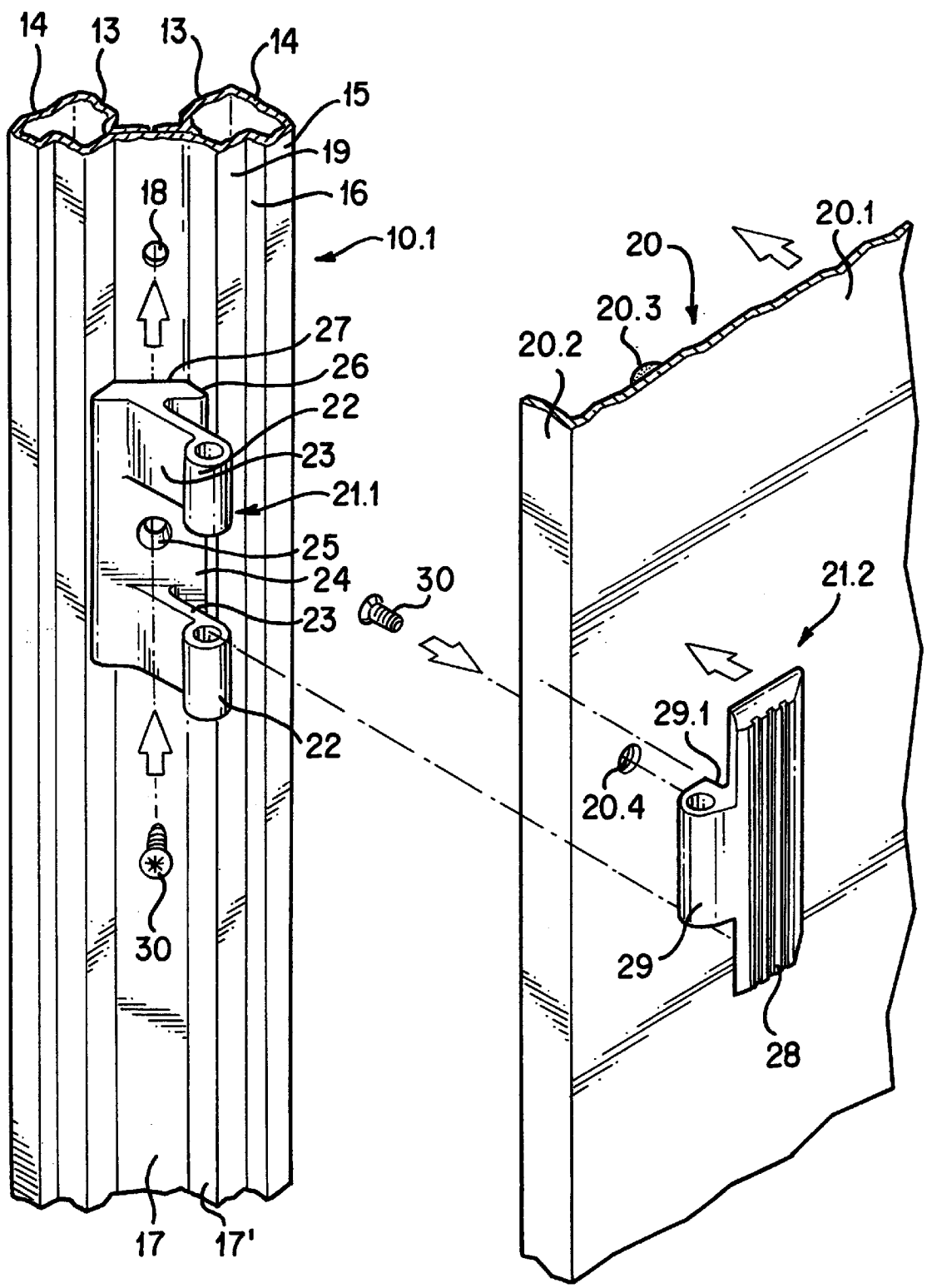
FIG. 2 shows a perspective exploded view of a section of a vertical frame section of the rack shown in FIG. 1, with a hinge and the side wall in a partial view.

The detailed embodiment of two hinge variants is further explained below with reference to FIGS. 2 to 5. A section of a vertical frame section 10.1 is shown in FIG. 2. The vertical frame section 10.1 has two fastening flanges that are connected to each other via a connection section 17. The fastening flanges have section sides 13, 14 that face the interior of the switching cabinet. The section sides 13,14 are perpendicular to each other and perpendicular to the outsides of the rack. The connection section 17 is recessed relative to the virtual outer edge of the rack so that a mount directed toward the outside of the rack is produced. Two support sections 17' are connected to the connection section 17 and are at a right angle to the facing sides of the rack. The support sections 17' grade at a right angle into shoulders 19. Beveled edges 16 are bent out at right angles from the shoulders 19 and grade into support connectors 15. A hinge 21 can be fastened to the vertical frame section 10.1. The hinge 21 comprises two hinge parts 21.1, 21.2. The first hinge part 21.1 has a fastening section 24 having an overall plate-like shape. Two connectors 23 are arranged at a spacing on the fastening section 24. The connectors 23 carry hinge bolt mounts 22. The holes traversed by the hinge bolt mounts 22 are aligned with each other. For attachment of the first hinge part 21.1 to the vertical frame section 10.1 a screw mount 25 is made in the fastening section 24. The fastening screw 30 can be introduced to the screw mount 25 and screwed into a hole 18 of the connection section 17 of vertical frame section 10.1. For this purpose the fastening screw 30 is designed as a tapping screw. The first hinge part 21.1 in a screwed-in state is positioned against the connection section 17 with a vertical support surface 27. Centering surfaces 26 are connected to the support surface 27 at an angle. The centering surfaces 26 align the first hinge part 21.1 on the support section 17'. The second hinge part 21.2 can be fastened to a side wall 20. As is apparent in FIG. 2, the side wall 20 has a flat wall 20.1, which has bevelings 20.2 on its edges. A seal 20.3 is formed onto the inside of the side wall 20 at a spacing from the bevelings 20.2. In the region between beveling 20.2 and the seal 20.3 the wall 20.1 is perforated by fastening mounts 20.4. A fastening screw 30 can be introduced on the back side through the fastening mounts 20.4 and screwed into the second hinge part 21.2. The second hinge part 21.2 in the tightened state is positioned against the front side of the wall 20.1 with a fastening section 28. The fastening section 28 carries a hinge bolt mount 29, which is penetrated by a hole with a vertical hole axis. The hinge bolt mount 29 has a support surface 29.1. The support surface 29.1 is aligned with the beveling 20.2. To complete the hinge 21, the hinge bolt mounts 22, 29 of the two hinge parts 21.1, 21.2 are aligned with each other. A hinge pin can then be introduced into the hinge bolt mounts 22, 29. As is apparent in FIG. 2, the vertical hinge axis, which is formed by the hinges 21, is arranged in front of the wall 20.1. Thus the side wall can be pivoted out by 180°.

The rack according to FIG. 1 is shown in FIG. 3 in a horizontal section and a partial view. The cross section of the vertical frame section 10.1 is readily apparent from this view. As already explained above, the side wall 20 can be pivoted out by 180° because the hinge axis is maintained in front of the wall 20.1. The side wall 20 mounted on the back of the rack is also apparent from FIG. 3. The side wall 20 is designed the same as the hinged side wall 20. The side wall 20 has fastening mounts 20.5, which are introduced in a region between the continuous seal 20.3 and the beveling 20.2 in the wall 20.1. Fastening screws can be introduced through the fastening mounts 20.5 and screwed into the side wall supports 12, as shown in FIG. 1.

The side wall 20 is shown in the closed position in FIG. 4. For reasons of clarity FIG. 4 does not show all reference numbers. FIG. 4 clarifies that the seal 20.3 of the side wall 20 is pressed onto the corresponding support connector 15 in the closed state. Thus, the interior of the switching cabinet is protected from the effects of moisture.

Figure 5:
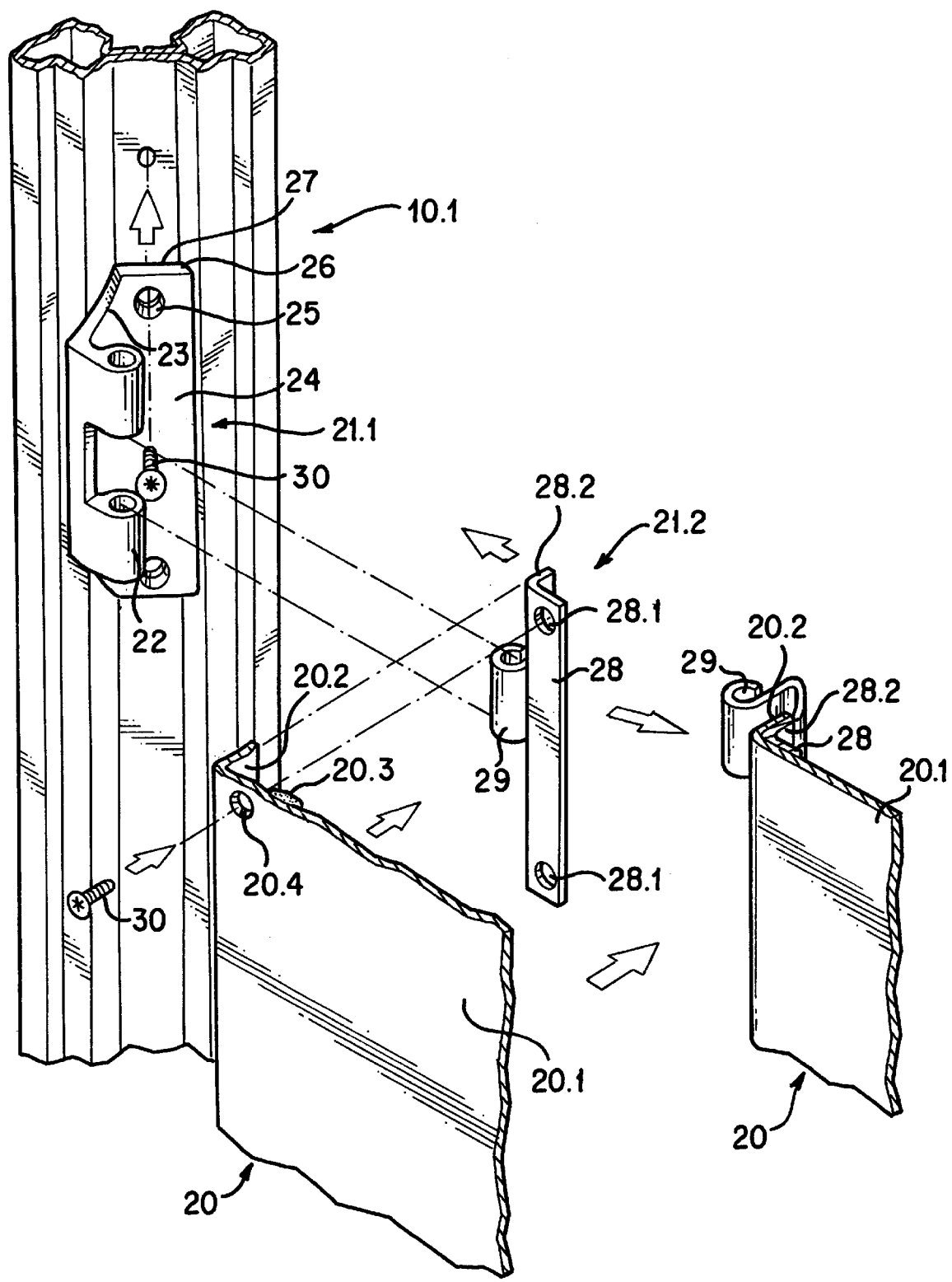
FIG. 5 shows a perspective exploded view of a section of a vertical frame section of the rack shown in FIG. 1, with a hinge and with the side wall in a partial view.

An embodiment of a hinge 21 is shown in FIG. 5. The hinge 21 has two hinge parts 21.1, 21.2. The hinge part 21.1 is designed in similar fashion to the hinge part 21.1 shown in FIGS. 2 to 4. One difference is that the hinge bolt mounts 22 are maintained in the region behind the plane formed by the wall 20.1 and the side wall 20. The vertical hinge axis is therefore recessed relative to the wall 20.1.

The second hinge part 21.2 is arranged in the beveled region of side wall 20. The second hinge part 21.1 is produced as a stamped-bent part from a steel sheet cutout and has a vertical fastening section 28 from which a support section 28.2 is beveled at a right angle. The fastening section 28 is positioned flat on the back of the side wall 20. The second hinge part 21.2 can be aligned with support section 28.2 on the beveling 20.2 of the side wall 20.

The support section 28.2 carries the hinge bolt mount 29. Because of the arrangement of the hinge axis, an opening angle of 90° can be obtained with the hinge 21.

What is claimed is:

1. In a switching cabinet having a rack assembled from horizontal and vertical frame sections, wherein the rack is covered by a cabinet door and side walls, and wherein the cabinet door is hinged to one of the vertical frame sections and can be pivoted about a vertical pivot axis, the improvement comprising:

at least one of the side walls (20) being one of fixedly mounted on the rack and hinged to pivot about a vertical axis of a hinge (21);

wherein the at least one side wall (20) has a plurality of first fastening mounts (20.4) to which one of the hinge (21) and a plurality of side wall supports are attached which are connected to a corresponding one of the vertical frame sections (10.1);

wherein the hinge (21) of the side wall (20) maintains the vertical pivot axis in front of an outward facing front side of the side wall (20) to permit an opening angle of 180°;

wherein the vertical frame sections (10.1) have an outer mount for the hinge (21) of the side wall (20) directed in a longitudinal direction of the vertical frame sections (10.1) and are directed toward the outside of the rack which is bounded by two longitudinally directed side support sections (17) on which the hinge (21) is aligned with a centering surface (26); and wherein the at least one side wall (20) hinged to the rack has a plurality of second fastening mounts (20.5) on a closure side opposite a hinge side, on which the at least one side wall (20) is locked to the plurality of side wall supports in the closed state.

2. In the switching cabinet according to claim 1, wherein the second fastening mounts (20.5) comprise openings through which fastening screws are passed and screwed into threaded mounts of the side wall supports.

3. In the switching cabinet according to claim 2, wherein the hinged side wall (20) has a continuous seal (20.3) on an inside facing a switching cabinet interior and the hinge (21) is screwed to the side wall (20) outside of a sealing area enclosed by the continuous seal (20.3).

4. In the switching cabinet according to claim 1, wherein the hinged side wall (20) has a continuous seal (20.3) on an inside facing a switching cabinet interior and the hinge (21) is screwed to the side wall (20) outside of a sealing area enclosed by the continuous seal (20.3).

* * * * *